Patented Dec. 24, 1940

2,225,867

UNITED STATES PATENT OFFICE 2,225,867

PARASITICIDAL COMPOSITIONS CONTAINING COPPER AND ZINC OXIDES

Loren C. Hurd, Glenside, Pa., assignor to Röhm & Haas Company, Philadelphia, Pa.

No Drawing. Application June 20, 1939,
Serial No. 280,062

7 Claims. (Cl. 167—14)

This invention relates to improved fungicidal preparations which contain a copper oxide, preferably cuprous oxide. More particularly it relates to fungicidal compositions in which the copper oxide is activated by the presence of zinc oxide.

The copper oxides have been found of particular value in the control of plant parasites in both sprays and dusts. Zinc compounds on the other hand have been found of particular value in horticultural dusts and sprays only in special instances. For example, it is reported that zinc compounds are of value in regions where there is a zinc deficiency. Also, co-precipitation of zinc and copper as silicates is said to improve the physical form of copper silicate.

While much effort has been expended in determining which copper compound has the maximum fungicidal value with the minimum phytocidal effect, it frequently occurs that the amount of a copper compound necessary to control parasites also produces foliage injury, russeting of fruit or other damage due to the toxicant. Attempts have been made to decrease the chances for injury by more efficient application with spreaders and stickers and by adding "safeners" to decrease the solubility of the copper compounds. Yet the fungicidal value depends upon gradual solubility and availability of copper ions. Safety to plants seems to depend upon the rate at which copper becomes available on the plant, also upon its concentration. Low concentrations are also advisable to avoid cumulative effects of heavy metals. Copper oxides, and cuprous oxide in particular, possess very favorable rates of availability of copper. A simple means has now been found to decrease the amount of the oxides which are required for efficient control of parasites.

It is an object of this invention to provide parasiticidal compositions of increased efficiency and of adequate safety. It is a further object to provide fungicidal compositions which permit the use of a minimum of toxic material for control of infestations of fungi. It is also an object to provide a means of reducing the amount of copper required to control the growth of noxious organisms in water. It is also an object to increase the efficacy of oil or water sprays containing a copper oxide. It is also an object to enhance the fungicidal potency of dusts containing copper oxides. It is a further object to supply zinc as well as copper in fungicidal or parasiticidal sprays.

I have found that the effectiveness of copper oxides is considerably increased by the presence of zinc oxide. The increase in effectiveness of copper oxides in the presence of zinc oxide is sufficient to distinguish such combination from all others tested. In fact, synergistic action, as found for copper oxide-zinc oxide mixtures, was not evident in the case of other copper compounds.

In the preferred form of this invention cuprous oxide and zinc oxide are mixed in proper proportion. Tests on various types of foliage have demonstrated that one part of zinc oxide to four parts of cuprous oxide or cupric oxide is as large a proportion of zinc as can be safely used. On the other hand, the synergistic effect of zinc is definitely present in mixtures containing as little as one part of zinc oxide in 199 parts of cuprous oxide. The preferred ratios of zinc oxide to copper oxide lie between 1:9 and 1:39.

The effectiveness of zinc as a fungicide is not marked and, if a high concentration of a zinc compound is used in a dust or spray, there will be found necrotic areas on foliage, which are usually white in color, and which are due to the toxic effects of this element. When zinc oxide was applied to plates coated with spores of *Macrosporium sarcinaeforme* fungi, over a range of concentrations such as might be used for protecting plants, it was found that only 3 to 33% of the spores failed to germinate. Under similar conditions various copper compounds prevented germination of 12 to 80% of the spores. It would be expected that a mixture of zinc oxide and a copper fungicide would, therefore, show somewhat less activity than the pure copper compound. This was found to be true in many cases where the effects were purely additive as might have been expected. In some other cases the presence of a zinc compound actually decreased the potency of the spray.

For example, a basic copper sulfate sold commercially was mixed with zinc oxide in the ratios of four to one and nine to one. A copper aluminum silicate of the zeolite type was likewise mixed with zinc oxide in the same ratios. Applications of these various mixtures were made at several recommended concentrations by spraying them on prepared plates carrying *Macrosporium sarcinaeforme*. The plates were then incubated and counts of spores made. Results in terms of spores not germinated are recorded in the following tables. The first column shows the ratio of total metal on the plate in different applications of the same group of sprays. The second column shows the per cent. of spores not germinated when the copper compound was used alone. The third and fourth columns contain the per cent. of spores not germinated in the presence of both copper and zinc.

TABLE I

*Per cent. spores not germinated*
*Various copper compounds*

| Compound | Ratio of metal | Compound alone | Compound and ZnO 4:1 | Compound and ZnO 9:1 |
|---|---|---|---|---|
| Basic copper sulfate | 1 | 42 | 32 | 35 |
|  | 2 | 72 | 56 | 52 |
| Copper zeolite | 1 | 26 | 10 | 22 |
|  | 2 | 53 | 18 | 32 |
|  | 4 | 70 | 41 | 60 |
| Bordeaux | 1 | 12 |  | 6 |
|  | 2 | 62 |  | 16 |

There have also been included in the above table results with a 5:5:50 Bordeaux spray which was modified by replacement of 10% of the copper sulfate with zinc sulfate.

It will be seen in all the above cases that the replacement of copper by zinc at constant metal concentration has decreased the fungicidal efficiency. The same results were obtained with copper silicate to which zinc oxide was added and with copper silicate to which zinc silicate was added. These experiments indicate that any reported increased efficiency from the silicate combinations containing zinc must be due primarily to the changes in physical form of the product rather than to the mere presence of zinc. In most cases the decrease is greater than would be calculated from the separate effects of the copper and zinc materials.

TABLE II

*Per cent. spores not germinated*
*Copper oxides*

| Compound | Ratio of metal | Oxide alone | Oxide and zinc oxide 9:1 | Oxide and zinc oxide 19:1 | Oxide and zinc oxide 199:1 |
|---|---|---|---|---|---|
| Cuprous oxide (red) | 1 | 47 | 73 | 71 |  |
|  | 3 | 65 | 85 | 87 | 79 |
|  | 5 | 79 | 100 | 100 | 89 |
| Zinc oxide | 1 | 3 |  |  |  |
|  | 3 | 6 |  |  |  |
|  | 5 | 22 |  |  |  |
| Cupric oxide | 1 | 21 |  | 26 |  |
|  | 2 | 37 |  | 55 |  |

These results obtained under carefully controlled conditions demonstrate conclusively the synergistic action of zinc oxide on copper oxides. The effect occurs with both cuprous and cupric oxides, although from the point of view of practical use cuprous oxide is the more desirable fungicide. While red cuprous oxide is shown in the above tests, parallel results were obtained with yellow and purple cuprous oxides.

When the zinc oxide was replaced with zinc carbonate, zinc silicate or zinc oxalate, results were no more than additive and such mixtures failed to show the activating effect found for zinc oxide on the copper oxide.

Lots of zinc oxide from different origins were examined but showed no differences in fungicidal activity. It was also established that mixtures of zinc oxide and cuprous oxide may be combined with "safeners" and "stickers" without changing the synergistic effect. Thus, compositions which include lime or magnesium oxide and a spreader such as sulfite-lignin are suitable for use in sprays or dusts.

Zinc oxide was added to a mixture consisting of four parts of yellow cuprous oxide, two parts of magnesia and one part of "Goulac," a cellulose-sulfite waste product, so as to give ratios of cuprous oxide to zinc oxide of 19:1 and 4:1. The mixture of cuprous oxide, magnesia and Goulac has been shown in application Serial No. 206,377 filed May 6, 1938 to be unusually valuable in obtaining good suspensions in sprays, adequate wetting of foliage and parasites, and excellent retention on foliage. The several mixtures were taken up in water and sprayed under controlled conditions of pressure and time onto plates coated with spores of *Macrosporium sarcinaeforme* so as to give definite concentrations of metal on a given area. The plates were incubated for twenty-four hours. Counts were then made.

Controls were run with zinc oxide without copper oxide at concentrations of 0.0083 and 0.0148 mg. of zinc per square inch. Here 99% of the spores germinated. A control of cuprous oxide at 0.0074 mg. of copper per square inch showed that 33% of the spores did not germinate. The mixtures containing zinc oxide were applied so as to keep the total metal concentration the same—0.0074 mg. of both zinc and copper per square inch. At the ratio of 19:1 (yellow cuprous oxide to zinc oxide) 52% of the spores did not germinate, while at 4:1 60% did not germinate.

Similar mixtures were made, in which, however, the magnesia was replaced with a neutral clay. Results were essentially the same, the per cent. of spores not germinating being 50% at the 19:1 ratio, as compared to 52%.

In the practical application of cuprous oxide-zinc oxide fungicides it has been observed that stem and rot (due to *Macrosporium solani*) of fruit trees was better controlled than with any other materials. It was found that mixtures containing one part of zinc oxide to four parts of cuprous oxide at times produced a slight bronzing which was indicative of injury. At ratios of 1:9 or 1:19 there was no such injury observed and at excessive concentrations of these fungicides the only injury was the typical russeting due to copper. The combined materials appear, therefore, to be quite safe when properly applied and when the ratio of zinc oxide, or its equivalent, to cuprous oxide is less than 1:4.

In spraying potato plants for early blight (*Alternaria solani*) and late blight (*Phytophthora infestans*) it was observed that two to three pounds of a preparation containing 50% cuprous oxide, 25% sulfite-lignin, 6.25% zinc oxide, and 18.75% clay along with six pounds of talc per 100 gallons of spray gave adequate protection against these blights and also against leaf hoppers and gave results not very different from those obtained with a 5:5:50 Bordeaux. In both cases the sprays were applied at the rate of 125 gallons per acre. A higher percentage of leaves was found free from blight with the cuprous oxide-zinc oxide spray than with 5:5:50 Bordeaux, which represents a very strong spray.

The combination of zinc oxide and cuprous oxide was further tested on sweet potatoes. Many varieties of sweet potatoes are susceptible to a fungus disease known as "wilt", "blue-stem", or "split-stem" caused by *Fusarium batatatis*. The control of the disease was studied with various fungicidal agents. The basal ends of sprouts were immersed in an aqueous suspension of a fungicide with care being taken to keep the suspension from the foliage. The sprouts were set in the field at once. Counts were made three weeks and seven weeks later.

Data were obtained for cuprous oxide with zinc oxide, cuprous oxide, Bordeaux mixture, and a new, improved mercurial especially recommended for the application and are presented in Tables III and IV. The term "red mixture" refers to a mixture made with four parts of red cuprous oxide and one part of zinc oxide, while the term "yellow mixture" refers to a similar mixture made with yellow cuprous oxide. A method for the preparation of a dry, stable, yellow cuprous oxide suitable for use in this invention is described in application Serial No. 244,919, filed December 10, 1938. The copper fungicides were applied at the rate of two pounds of total material in 50 gallons of water; the Bordeaux mixture was a 4:4:50 preparation; the mercurial preparation was used at the rate of 1 lb. in 10 gallons of water. The tests reported in Table III and in Table IV were made on different farms.

TABLE III

*Percentage of wilt disease on Cedarville variety of sweet potatoes*

TEST NO. 1

| Fungicide | Wilt (in per cent.) | |
|---|---|---|
| | 1st count | 2d count |
| None | 13.4 | 43.0 |
| Bordeaux | 4.5 | 22.8 |
| Mercurial | 2.8 | 19.8 |
| Red mixture | 1.8 | 16.5 |
| Yellow mixture | 1.0 | 13.8 |

TABLE IV

*Percentage of wilt disease on Cedarville variety of sweet potatoes*

TEST NO. 2

| Fungicide | Wilt (in per cent.) | |
|---|---|---|
| | 1st count | 2d count |
| Yellow oxide | 4.6 | 16.8 |
| Yellow mixture | 1.7 | 11.7 |
| None | 11.1 | 24.0 |

In another series of tests on a third farm similar results were obtained with Bigstem Jersey variety of sweet potatoes. All copper mixtures were used at the rate of two pounds per 50 gallons of water. In these tests a spreader was used with the red and yellow oxide to improve suspension and application but was not added to the mixtures with zinc oxide.

TABLE V

*Percentage of wilt disease on Bigstem Jersey variety of sweet potatoes*

TEST NO. 3

| Fungicide | Wilt (in per cent.) | |
|---|---|---|
| | 1st count | 2d count |
| None | 25 | 7.3 |
| Red oxide, sticker | 13 | 3.7 |
| Red mixture | 8 | 2.3 |
| Yellow oxide, sticker | 7 | 1.9 |
| Yellow mixture | 0 | 0 |

These results demonstrate that the addition of zinc oxide to copper oxides increases the effectiveness of the resulting preparation.

I claim:

1. A method of controlling fungi on plants which comprises applying to said plants a composition containing one part of zinc oxide and at least four parts of a copper oxide.

2. A method of controlling fungi on plants which comprises applying to said plants a composition containing one part of zinc oxide and at least four parts of cuprous oxide.

3. A method of controlling fungus growths which comprises applying thereto a composition containing cuprous oxide and zinc oxide, in which the ratio of cuprous oxide to zinc oxide is at least four to one.

4. A fungicidal composition suitable for use on living plants which comprises at least four parts of a copper oxide to one part of zinc oxide.

5. A fungicidal composition which comprises at least four parts of cuprous oxide to one part of zinc oxide.

6. A fungicidal composition containing yellow cuprous oxide and zinc oxide, in which the ratio of yellow cuprous oxide to zinc oxide is at least four to one.

7. A parasiticidal composition containing cuprous oxide and zinc oxide, in which the ratio of cuprous oxide to zinc oxide is between about nine to one and thirty-nine to one.

LOREN C. HURD.